United States Patent [19]

Posnikoff

[11] 4,313,620
[45] Feb. 2, 1982

[54] DEVICE FOR LIMITING LATERAL CANTING OF ROAD VEHICLES

[76] Inventor: Fred Posnikoff, c/o Summit Spring Service Ltd., 198 Welland Ave., St. Catharines, Ontario, Canada, L2R 2P3

[21] Appl. No.: 74,032

[22] Filed: Sep. 10, 1979

[51] Int. Cl.³ .............................................. B60T 11/02
[52] U.S. Cl. ..................................... 280/718; 267/44; 267/47; 267/54 R; 267/158
[58] Field of Search ................... 267/36 R, 44, 45, 47, 267/158, 56, 160, 43, 46, 54 R, 55, 42; 280/694, 699, 718

[56] References Cited

U.S. PATENT DOCUMENTS

| | | | |
|---|---|---|---|
| 1,200,194 | 10/1916 | Houdaille | 267/44 |
| 1,548,500 | 8/1925 | Wiles | 267/45 |
| 1,810,797 | 6/1931 | Symank | 267/47 |
| 1,858,930 | 5/1932 | Hoover | 267/45 X |
| 1,991,580 | 2/1935 | Samuels | 267/45 |
| 2,384,795 | 9/1945 | Canady | 267/36 R |
| 2,387,874 | 10/1945 | Bradley | 267/36 R |
| 2,841,404 | 7/1958 | Eitel | 280/718 X |

FOREIGN PATENT DOCUMENTS 25729  9/1930  Australia ............................... 267/47

Primary Examiner—George E. A. Halvosa
Attorney, Agent, or Firm—Pollock, Vande Sande & Priddy

[57] ABSTRACT

The normally generally straight, slightly arcuate main leaf of an auxiliary or "helper" leaf spring bundle is modified to include loops at both ends thereof, enveloping the respective helper leaf bracket of the frame, to provide additional anti-sway resistance. The device combines extreme simplicity, particularly in modification of existing suspension systems, for instance when it is desired to use a truck frame in applications subjecting same to extreme canting forces, for instance, in combination with a boom mechanism of a cherry picker device or the like.

3 Claims, 8 Drawing Figures

DEVICE FOR LIMITING LATERAL CANTING OF ROAD VEHICLES

The present invention relates to road vehicle suspension systems and in particular to means for limiting lateral canting of a road vehicle frame. In another aspect, the present invention relates to modification of existing suspension systems to further improve stability of a vehicle with respect to its resistance to lateral canting. Especially, the invention relates to modifications of existing truck suspension systems such as to make the same more resistant to lateral canting and thus more capable of carrying accessories of the type including an extension boom, such as hydro-servicing buckets or the like.

Many different systems are known which are designed for improving stability of a road vehicle during driving, the systems being directed towards improving stability of the suspension with respect to lateral canting due to centrifugal force generated by driving along a curve or the like. It is also known to provide auxiliary systems for preventing or at least limiting lateral canting of road vehicles of the type containing a boom of, for instance, a crane. The latter type of auxiliary systems can generally be divided into two groups; the first group is typified by additional supports or legs that are lowered to ground when the system carried by the vehicle is in use. The second group generally includes means for more or less fixedly securing the vehicle frame to its axles thus virtually eliminating the function of the resilient suspension system.

Prior art representative of different systems as referred to above is represented, by way of examples, by British Patent Specifications Nos. 357,638; 383,607; 417,080; 519,308; 523,738.

The general drawback of the known systems is in their complexity, particularly when an auxiliary system is involved which is desired to be used in addition to another anti-sway system already installed by the manufacturer of the vehicle.

It is an object of the present invention to provide a device for limiting lateral canting of a road vehicle of the type that may be additional to an existing system already installed on the vehicle. Another object of the present invention is to provide a device for limiting lateral canting of a road vehicle which is capable of being added to an existing suspension at relatively low cost, with minimum modifications required in the existing system. It is a still further object of the present invention to provide a device of the above type which limits lateral canting of road vehicles without requiring any additional control means for putting the device into operation, the device becoming operable on reaching a predetermined lateral cant of the frame of a vehicle.

In general terms, the above objects are attained by providing a main leaf for use in laminated leaf spring assembly, said main leaf being of the type of a generally flat configuration including a central portion, a front end portion and a rear end portion and normally concavo-convex intermediate portions one extending between said front end portion and said central portion, the other extending between said central portion and said rear end, whereby said end portions and said central portion define an integral leaf of generally symmetrical arcuate configuration defined by convex and concave surfaces of the leaf, an inwardly turned loop at each end of the leaf, each loop comprising a rounded section turned away from the convex surface and defining the extreme limit of the respective end of the leaf, each rounded section, in turn, merging with an inwardly sloped, generally straight portion disposed at an acute angle relative to the adjacent part of the respective intermediate portion.

In another aspect, the present invention provides a semi-elliptical laminated spring of the type including a plurality of generally flat spring leaves of different lengths forming an arcuate spring bundle, said spring including a main spring leaf of a generally symmetrical arcuate configuration including upwardly and inwardly turned end portions, each end portion being formed by a round, upwardly turned section, merging with a generally planar, downwardly and inwardly sloping section, whereby a generally horizontally elongate V-shaped loop is formed at each end of the spring.

In a still further aspect of the present invention, a spring assembly is provided for use in vehicle suspension of the type of a main semi-elliptical, laminated main leaf spring adapted to be fixedly secured to a vehicle axle and to be operatively connected to a vehicle frame for resilient suspension of said frame on said axle; and an auxiliary helper spring of the type of a semi-elliptical laminated leaf spring operatively associated with said main spring for a joint operation therewith to provide additional resilient suspension when the weight acting on said frame exceeds a predetermined value, wherein said auxiliary spring includes a main spring leaf of a generally arcuate configuration including upwardly and inwardly turned end portions, each end portion being formed by a round, upwardly turned section merging with a generally planar, downwardly and inwardly sloping section, whereby a generally horizontally elongated, V-shaped loop is formed at each end of said auxiliary spring.

In yet another aspect of the present invention a road vehicle suspension system is provided which includes a wheel axle, a frame, main spring means operatively interposed between the frame and the axle to provide resilient suspension therebetween, and auxiliary or helper spring means of semielliptical laminated leaf spring generally fixedly secured to the axle and having a front end portion and a rear end portion each adapted to engage an underside of a front and rear helper bracket member, respectively, when pressure exerted by said frame on said axle exceeds a predetermined value; wherein said auxiliary spring means includes a main spring leaf having an inwardly turned loop at each end, each loop having a free end engagement portion disposed above the respective bracket member, whereby said free end engagement portions are capable of engaging the respective members at the top thereof when said frame is subjected to a predetermined lateral canting movement.

According to a still further aspect of the present invention, a road vehicle undercarriage means is provided of the type including a generally rigid frame, ground engaging means mounted on a front axle and a rear axle, respectively; and suspension means for resiliently suspending said frame on said axles, wherein the suspension means of said rear axle includes a laminated semi-elliptical main leaf spring at each end of the rear axle, a semi-elliptical auxiliary spring mounted above the main spring, both said springs extending generally longitudinally of said frame; a pair of brackets fixedly secured to side members of said frame and including spring engagement members protruding generally horizontally from the respective side member of the frame near respective ends of said auxiliary spring, said spring engagement members being normally spaced from the respective ends and being disposed above the same for engagement with a top portion of said auxiliary spring at the respective ends thereof, said auxiliary spring including a main spring leaf having a front end and a rear end, each said end having an upwardly and inwardly turned loop, the loop including a section normally disposed above and spaced from the top surface of the respective spring engagement member, whereby said auxiliary spring is normally dissociated from the respective spring engagement members, and becomes engaged by the same only at selected extreme, generally vertical displacement of the respective side member relative to the rear axle, in both generally vertical directions.

The invention will now be described by way of an embodiment showing the application of the same to a utility truck of the well known type including an extension boom used, for instance, in servicing hydro lines or the like. The description will be made with reference to the accompanying simplified drawings out of scale wherein.

Figure 1:
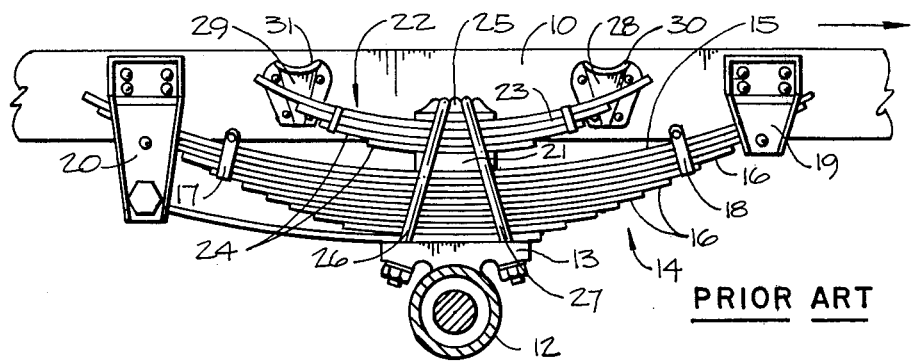
FIG. 1 is a partial side view of a truck suspension system of prior art including a main leaf spring and a helper or auxiliary leaf spring.

Turning firstly to FIG. 1, a standard, known suspension system of a truck is shown which includes a side member 10 of a truck frame, the arrow 11 pointing towards the front of the respective vehicle. Reference numeral 12 designates a rear axle of the vehicle which is provided with a spring seat 13 on which rests a main spring bundle 14 including a main leaf 15 and a plurality of graduated spring leaves 16, the leaves being held together by a centrally located bolt (not shown in the drawing) and being also provided with shackles 17, 18 which prevent the fanning of the bundle, as is well known. The top surface of the main leaf 15 is engaged with a front bracket 19 and with a rear bracket 20, both brackets being fixedly secured to the side member 10 of the vehicle frame. An intermediate pad 21 is disposed centrally on top of the main spring bundle 14 to provide central support for an auxiliary or helper spring bundle 22 which, like the main spring bundle 14, is composed of a top, main leaf 23 and of a plurality of graduated leaves 24, of which the lowermost rests on the pad 21.

A top pad 25 is located centrally on top of the auxiliary spring bundle 22 and provides engagement means for spring yokes 26, 27, assisting in fixedly securing the auxiliary spring bundle 22 to the axle 12.

FIG. 1 also shows a front bracket 28 and a rear bracket 29 adapted for engagement with the top surface of the ends of the main spring 23 in a well known fashion, when the weight acting vertically downwardly on the side member 10 exceeds a predetermined value. The brackets 28, 29 are fixedly secured to the side of the side member 10 and include concavo-convex bracket members 30, 31, respectively protruding horizontally sidewise of the side member 10.

The features and function of the rear axle suspension of a truck are well known in the art and do not need any further detailed explanation. It is to be understood that as mentioned above, the truck whose part is shown in the simplified drawing of FIG. 1 may also include a sway preventing device such as a cross bar or the like. However, such standard equipment is not the subject of the present invention and therefore is not shown and need not be described in detail.

Assuming now that the truck whose suspension is shown in FIG. 1 is to be used in connection with, say, an apparatus including a long boom, for instance a crane or a cherry picker bucket, it is often desirable to further improve or stiffen the mechanism used in preventing sidewise tilting or canting of the frame of the vehicle.

Figure 2:
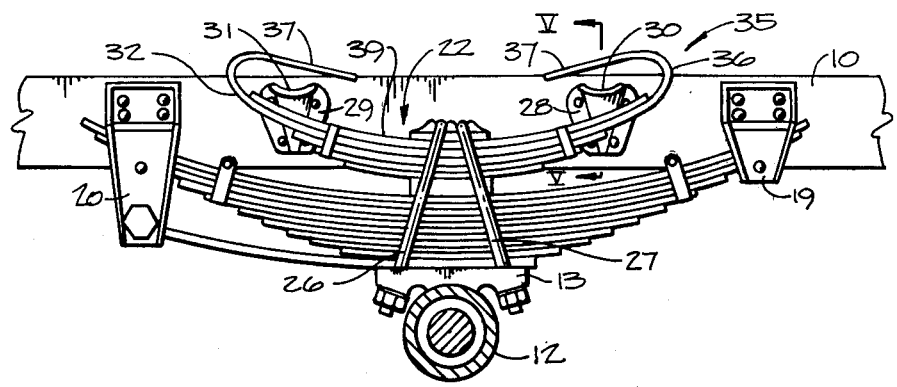
FIG. 2 is a view similar to FIG. 1 but showing the suspension as modified in accordance with the present invention, in a regular, unloaded position.
Figure 8:
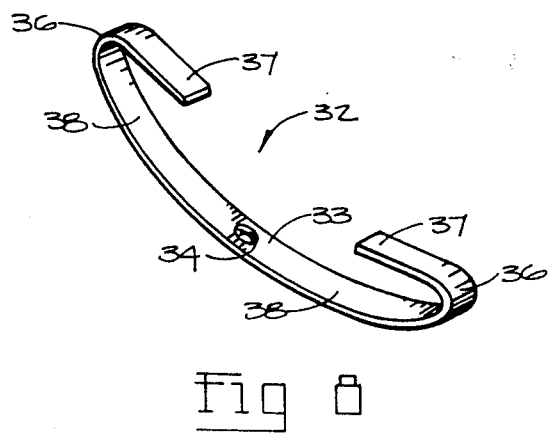
FIG. 8 is a perspective view of the preferred embodiment of a main spring leaf according to and for use in the present invention.

FIG. 2 shows the same assembly as described above with reference to FIG. 1 but having a preferred embodiment of the present invention. In particular, it will be observed that the only change effected in the assembly of FIG. 2 is in the arrangement of the auxiliary spring bundle 22. The main leaf 23 of the auxiliary spring bundle 22 of FIG. 1 is replaced by a main leaf 32 of a configuration designed in accordance with the present invention. With particular reference to FIG. 8, the main leaf 32 is an integral piece shaped such as to form a central portion 33, preferably provided with an opening 34 for passage of a central spring bolt holding the bundle 22 together and not shown in the present drawings. The front end 35 of the main leaf 32 is shaped such as to define a rounded, upwardly turned section 36 whose top portion, in turn, merges with a downwardly and inwardly sloping, generally planar section 37, thus forming a loop which, as seen from FIG. 2, provides sufficient clearance between the loop and the front bracket member 30. An intermediate portion 38 is disposed between the central portion 33 and the upwardly turned section 36 (FIG. 8).

Figure 3:
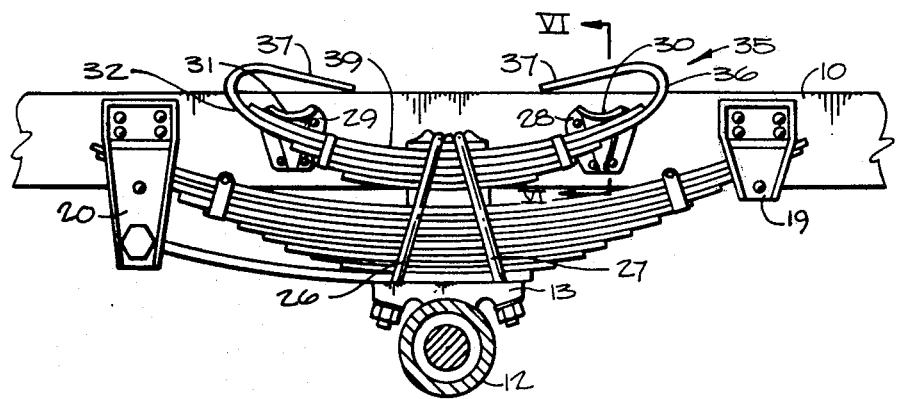
FIG. 3 is a view similar to FIG. 2 but showing the mutual position of elements of the present invention when load is applied to the frame of the vehicle.
Figure 4:
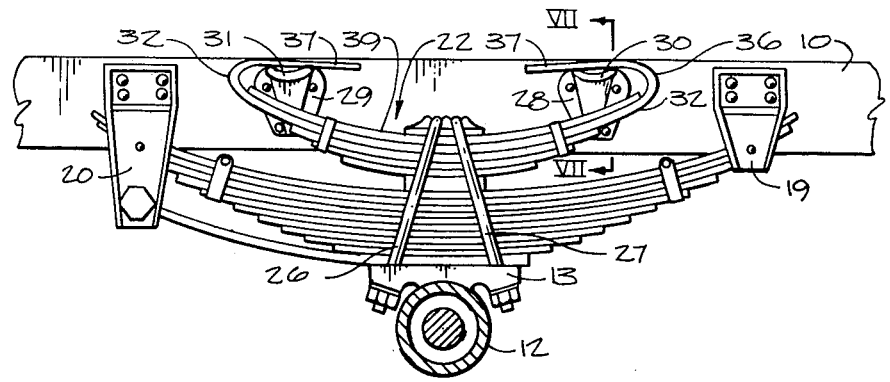
FIG. 4 is a view similar to FIG. 2 but showing the mutual position of elements of the present invention when the vehicle frame is subjected to a canting movement, for instance when a boom or the like is extended sidewise of the frame of the vehicle, generally in the direction away from the plane of FIG. 4 and from the viewer.

It will be apparent on review of FIGS. 2, 3 and 4 that the rear end of the main leaf 32 is a mirror image of its front end. Accordingly, the respective portions of the rear end of the main leaf are referred to with the same reference numerals.

Disposed on top of the main spring leaf 32 is a rebound leaf 39 whose free ends may be beveled (not shown in the drawings).

Figure 5:
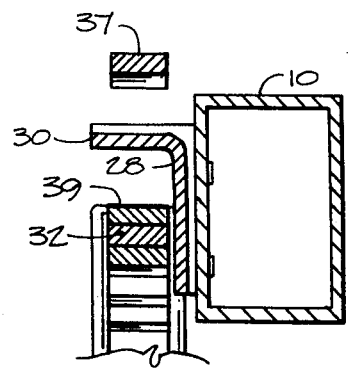
FIG. 5 is a section taken on line V—V of FIG. 2.

In operation, and assuming that the truck is under no operative stress, the mutual position of the elements of the auxiliary spring bundle is as shown in FIGS. 2 and 5.

Figure 6:
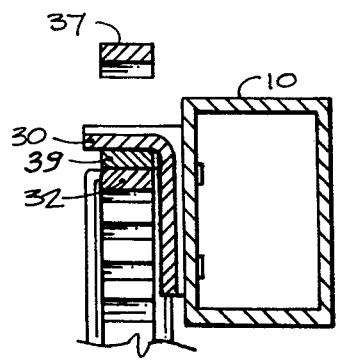
FIG. 6 is a section taken on line VI—VI of FIG. 3.

Assuming now that a boom is extended to a position out of the plane of FIG. 3 towards the viewer of such Figure, the frame of the vehicle will tend to cant such as to bring the bracket members 30, 31 into engagement with the top surface of the rebound leaf 39 (FIG. 3 and FIG. 6).

Figure 7:
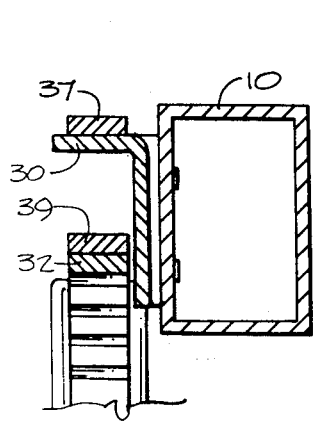
FIG. 7 is a section taken on line VII—VII of FIG. 4.

Assuming that the boom that may be mounted on the truck is turned sidewise away from the plane of FIG. 4 and pointing away from the viewer of such Figure, the mutual position will be as shown in FIG. 4 wherein the planar sections 37 of the main leaf 32 engage the top surfaces of the respective bracket members 30, 31 (FIG. 4 and FIG. 7). Those skilled in the art will readily appreciate that the side-wise canting of the frame brings one side of the disclosed leaf assembly into the position of FIG. 3, while the opposite side is generally as arranged in FIG. 4.

Those skilled in the art will readily appreciate that numerous modifications of the design of the suspension are possible. For instance, the size of the spring, the shape of the bracket members 30, 31, and the clearance between the loop can all be modified. The slope of the planar sections 37 as shown in FIG. 2 is deemed to be advantageous in that it compensates for the force to which the main leaf 32 is subjected when in the state of FIGS. 4 and 7. Yet, those skilled in the art will appreciate that the change of that slope is within the scope of the present invention. Similarly, it is readily conceivable that more than one leaf 32 can be employed for the purpose generally as described.

Therefore, many modifications may exist departing from the above embodiment, without departing from the scope of the present invention as recited in the accompanying claims.

I claim:

1. A road vehicle suspension system including, in combination:
   (a) an elongated frame and a wheel axle;
   (b) means for securing said axle to said frame comprising main spring means of the type of a semi-elliptical laminated first leaf spring fixedly secured to the axle, each end of the main spring means being secured to a respective main spring bracket means, each main spring bracket means being secured to the frame to maintain a flexible but permanent connection between the opposing ends of the main spring means and the frame at any instant state of compression or rebound of said main spring means;
   (c) auxiliary spring means of the type of a semi-elliptical laminated second leaf spring separate from said first leaf spring and fixedly secured to said axle, each end of said second leaf spring being disposed below and spaced from a respective auxiliary spring bracket fixedly secured to the frame, the upper side of the opposing ends of the auxiliary spring means being adapted to engage the underside of said auxiliary spring brackets only when the deflection of said main spring means exceeds a predetermined value;
   (d) said auxiliary spring brackets being separate from and independent of the main spring bracket means and being spaced from each other a distance shorter than that between said main spring bracket means;
   (e) said auxiliary spring means including an anti-tilt spring leaf having inwardly turned ends which are spaced from the frame and from the auxiliary spring brackets, the uppermost portions of said inwardly turned ends being normally disposed above and freely spaced from the upper sides of the respective auxiliary spring brackets, the lower surfaces of the uppermost portions of the inwardly turned ends of said anti-tilt spring leaf being engageable only with said upper sides of the respective auxiliary spring brackets when said frame exceeds a predetermined tilt in a direction transverse to the direction of elongation of said frame.

2. A suspension system as claimed in claim 1, wherein said auxiliary spring means further includes a rebound spring leaf forming the upper surface of the auxiliary spring means, said anti-tilt spring leaf being fixed into said auxiliary spring means at a position below said rebound spring leaf with portions of said inwardly turned ends of said anti-tilt spring leaf extending longitudinally outward of the opposing ends of said rebound spring leaf.

3. A suspension system as claimed in claims 1 or 2, wherein said system is disposed at one end of the axle, a generally identical system being disposed at the other end of the axle.

* * * * *